(12) United States Patent
Haghighi (10) Patent No.: US 10,003,648 B2
(45) Date of Patent: Jun. 19, 2018

(54) MECHANISM FOR UNIVERSAL PARALLEL INFORMATION ACCESS

(71) Applicant: Samsung Electronics Co., Ltd., Suwon-si, Gyeonggi-do (KR)

(72) Inventor: Siamack Haghighi, Sunnyvale, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 640 days.

(21) Appl. No.: 14/601,228

(22) Filed: Jan. 20, 2015

(65) Prior Publication Data

US 2016/0100027 A1    Apr. 7, 2016

Related U.S. Application Data

(60) Provisional application No. 62/059,141, filed on Oct. 2, 2014.

(51) Int. Cl.
| | | |
|---|---|---|
| G06F 15/167 | (2006.01) | |
| H04L 29/08 | (2006.01) | |
| H04L 29/06 | (2006.01) | |

(52) U.S. Cl.
CPC ...... H04L 67/1097 (2013.01); *H04L 67/1095* (2013.01); *H04L 69/14* (2013.01)

(58) Field of Classification Search
CPC .. H04L 67/1095; H04L 67/1097; H04L 69/14
See application file for complete search history.

(56) References Cited

U.S. PATENT DOCUMENTS 7,613,882 B1 * 11/2009 Akkawi ............. G06F 12/0833
                                                    709/214
7,725,669 B1 *  5/2010 Bingham ........... G06F 11/1464
                                                    711/161

(Continued)

OTHER PUBLICATIONS

Mohammad Al-Fares et al., "A scalable, commodity data center network architecture," Proceedings of the ACM SIGCOMM 2008 conference on Data communicationpp. 63-74, ACM New York, NY, USA ©2008, ISBN: 978-1-60558-175-0 doi>10.1145/1402958.1402967.

(Continued)

*Primary Examiner* — Anthony Mejia
*Assistant Examiner* — Dixon Dabipi
(74) *Attorney, Agent, or Firm* — Renaissance IP Law Group LLP (57) ABSTRACT

Inventive aspects include one or more local servers each including a local universal access logic section, one or more remote servers each including a remote universal access logic section, and a coherency node to provide coherent access to first data that is stored on the one or more local servers to the one or more remote servers, and to provide coherent access to second data that is stored on the one or more remote servers to the one or more local servers. Embodiments of the inventive concept herein can use hardware and/or software mechanism to unify direct and remote attached devices via command, data, status, and completion memory queues. Applications and operating systems can be presented with a uniform access interface for sharing data and resources across multiple disparately situated servers and nodes.

1 Claim, 9 Drawing Sheets

(56) References Cited

U.S. PATENT DOCUMENTS

| | | | | |
|---|---|---|---|---|
| 8,607,004 | B2* | 12/2013 | Anderson | G06F 12/084 |
| | | | | 709/203 |
| 9,008,113 | B2* | 4/2015 | Pope | G06F 13/128 |
| | | | | 370/419 |
| 9,047,351 | B2* | 6/2015 | Riddle | G06F 17/30519 |
| 9,244,846 | B2* | 1/2016 | Frey | G06F 12/0813 |
| 2002/0107990 | A1 | 8/2002 | Johnson et al. | |
| 2003/0018841 | A1* | 1/2003 | Lesartre | G06F 9/52 |
| | | | | 710/200 |
| 2003/0149839 | A1* | 8/2003 | Kuwata | G06F 12/0866 |
| | | | | 711/113 |
| 2010/0146068 | A1* | 6/2010 | Haviv | G06F 3/0613 |
| | | | | 709/212 |
| 2010/0306408 | A1 | 12/2010 | Greenberg et al. | |
| 2012/0207165 | A1* | 8/2012 | Davis | H04L 45/60 |
| | | | | 370/392 |
| 2012/0324068 | A1 | 12/2012 | Jayamohan et al. | |
| 2014/0189032 | A1* | 7/2014 | Sugimoto | H04L 67/1097 |
| | | | | 709/212 |
| 2015/0046656 | A1* | 2/2015 | Blinick | G06F 12/0848 |
| | | | | 711/129 |
| 2015/0186313 | A1* | 7/2015 | Sodhi | G06F 13/36 |
| | | | | 710/107 |
| 2016/0217104 | A1* | 7/2016 | Kamble | G06F 15/167 |

OTHER PUBLICATIONS

S.J.B. Yoo et al., "Intra and inter datacenter networking: The role of optical packet switching and flexible bandwidth optical networking," Optical Network Design and Modeling (ONDM), 2012 16th International Conference on Apr. 17-20, 2012, E-ISBN: 978-1-4673-1441-1, Print ISBN: 978-1-4673-1440-4, INSPEC Accession No. 12784301, Digital Object Identifier: 10.1109/ONDM.2012.6210261.

* cited by examiner

MECHANISM FOR UNIVERSAL PARALLEL INFORMATION ACCESS

RELATED APPLICATION DATA

This application claims the benefit of U.S. patent application Ser. No. 62/059,141, filed Oct. 2, 2014, which is hereby incorporated by reference.

BACKGROUND

The present inventive concepts relate to a mechanism for providing universal parallel information access, and more particularly, to a system and method for providing coherent access to shared data across multiple disparately situated computer servers.

Data center or enterprise computing organizations store and access real-time or stored information via the Internet, local storage devices such as a solid state drive (SSD), a hard disk drive (HDD), or remote devices via an Ethernet, fabric attached storage arrays, or other servers. The variety of communication mechanisms have resulted in different architectures and implementations such as direct attached storage and storage area network appliances.

In data centers and enterprise computing environment, access to real-time and/or stored information can be essential. Real-time information may be from users, external computing elements, and/or storage systems in media such as a hard disk drive (HDD), solid state drive (SSD), tapes, or storage arrays.

Conventional approaches to accessing shared data are complex and lack interoperability due to differences between direct or host bus adapter attached storage, storage area networks (SANs), or network attached storage (NAS) devices. This makes it difficult to deploy enterprise systems that are capable of efficiently and coherently accessing and sharing data and storage resources between multiple different computer servers. Embodiments of the present inventive concept address these and other limitations in the prior art.

BRIEF SUMMARY

Embodiments of the inventive concept include a universal parallel information access system. The system can include one or more local servers each including a local universal access logic section, one or more remote servers each including a remote universal access logic section, and a coherency node communicatively coupled to the one or more local servers and to the one or more remote servers and configured to coordinate with the local universal access logic section of the one or more local servers and with the remote universal access logic section of the one or more remote servers, and to provide coherent access to first data that is stored on the one or more local servers to the one or more remote servers, and to provide coherent access to second data that is stored on the one or more remote servers to the one or more local servers.

In some embodiments, the system can include one or more local servers each including a local universal access logic section, wherein the local universal access logic section includes a first coherency node that is configured to provide coherent access to first data that is stored on the one or more local servers to the one or more remote servers, and one or more remote servers each including a remote universal access logic section, wherein the remote universal access logic section is configured to provide coherent access to second data that is stored on the one or more remote servers to the one or more local servers.

Embodiments of the inventive concept can include a computer-implemented method for providing universal parallel information access. The method can include associating, by a local server, a first subset of a plurality of local write storage queues with each of a plurality of local write data queues. The method can include associating, by the local server, a first subset of a plurality of local read storage queues with each of a plurality of local read data queues. The method can include associating, by the local server, a second subset of the plurality of local write storage queues with one or more local outgoing data queues that are associated with a network interface card (NIC). The method can include associating, by the local server, a second subset of the plurality of local read storage queues with one or more local incoming data queues that are associated with the NIC.

In some embodiments, the method can include queuing local write data, by the plurality of local write data queues, for writing to a local storage device of the local server for one or more local applications of the local server. The method can include queuing the local write data, by the one or more local incoming data queues associated with the NIC for writing to the local storage device for one or more remote applications of a remote server. The method can include queuing local read data, by the plurality of local read data queues associated with the local server, for the one or more local applications of the local server. The method can include queuing the local read data, by the one or more local outgoing data queues associated with the NIC, for the one or more remote applications of the remote server.

In some embodiments, the method can include writing the local write data from the first subset of the plurality of local write storage queues to the local storage of the local server. The method can include writing the local write data from the second subset of the plurality of local write storage queues to remote storage of the remote server. The method can include providing the local read data from the first subset of the plurality of local read storage queues to the one or more local applications of the local server. The method can include providing the local read data from the second subset of the plurality of local read storage queues to the one or more remote applications of the remote server.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first server could be termed a second server, and, similarly, a second server could be termed a first server, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include a mechanism to organize and provide a universal storage system to data center computing environments by tiering storage to local or remote devices with a unified access model to be used by applications. Local storage can be available via locally attached storage devices such as solid state devices or drives (SSDs), hard disk drives (HDDs), or the like. Remote storage can be accessed via the Internet, an Ethernet network, or other fabric technologies such as an Ethernet attached HDD, an SSD appliance, and/oror storage that may be located locally in another computing node or server. Both local and remote storage can be accessed through queued command and/or data residing in system memory or a network interface card. Embodiments of the inventive concept includes a coherency mechanism such as a consistency table and/or semaphore logic to ensure consistency among local storage, remote storage, and computing systems, as further described below.

Embodiments of the inventive concept include a mechanism to uniformly organize and seamlessly provide information access among computing nodes or servers in a data center. Information can be structured, stored, and accessed in storage systems via files, blocks, logical block address (LBA), logical unit number (LUN), key-value pairs, objects, or the like. Embodiments of the inventive concept provide a uniform information or storage access model by combining local and remote devices, select and route exchange, semaphore/lock, and/or other protocols for guaranteed information consistency. Both local and remote information can be accessed through one or more command/data queues, which can reside in a computing node system memory or on network interface cards. The universal access mechanism can provide an interface to applications and users to store, share, and access information or storage regardless of the stored information location, while maintaining consistency.

Direct or assisted (e.g., host bus adapter, host control interface, or the like) devices can be accessed through command, data, and status commands or queues in a computing node. For example, one may open, write to, and close a file. These operations can be performed through operating system storage stacks, the storage device driver, and/or the device controller. The operating system software can process and break down open, close, and similar administration functions into smaller operations, which may use the device driver. These operations may be posted to administration queues, which may be located in system memory. Similarly, for write operations, the OS or device driver may place command entries into queues in memory and write information or statuses into other queues. Storage devices and device drivers can access memory queues and perform suitable functions.

For remote attached devices, a network or fabric device can use similar commands and data queues placed in memory to exchange information with external entities. The main difference as compared to direct attached storage mechanism is the use of special purpose hardware or subsystems such as a network adapter and its associated software drivers.

Embodiments of the inventive concept herein can use hardware or software mechanism(s) to unify direct and remote attached devices via command, data, status, and completion memory queues. Applications and operating systems can be presented with a uniform access interface for administration, command, data and status entries in queues and/or a new file system, as further described below. The new file system can internally track and distinguish among local and remote storage devices differentiating and accessing internal and remote devices via a select and route exchange entity. Moreover, operating system and computing device may provide consistency between shared access local and remote devices through one or more locks/semaphores or other appropriate mechanisms, as also further described below.

Figure 1:
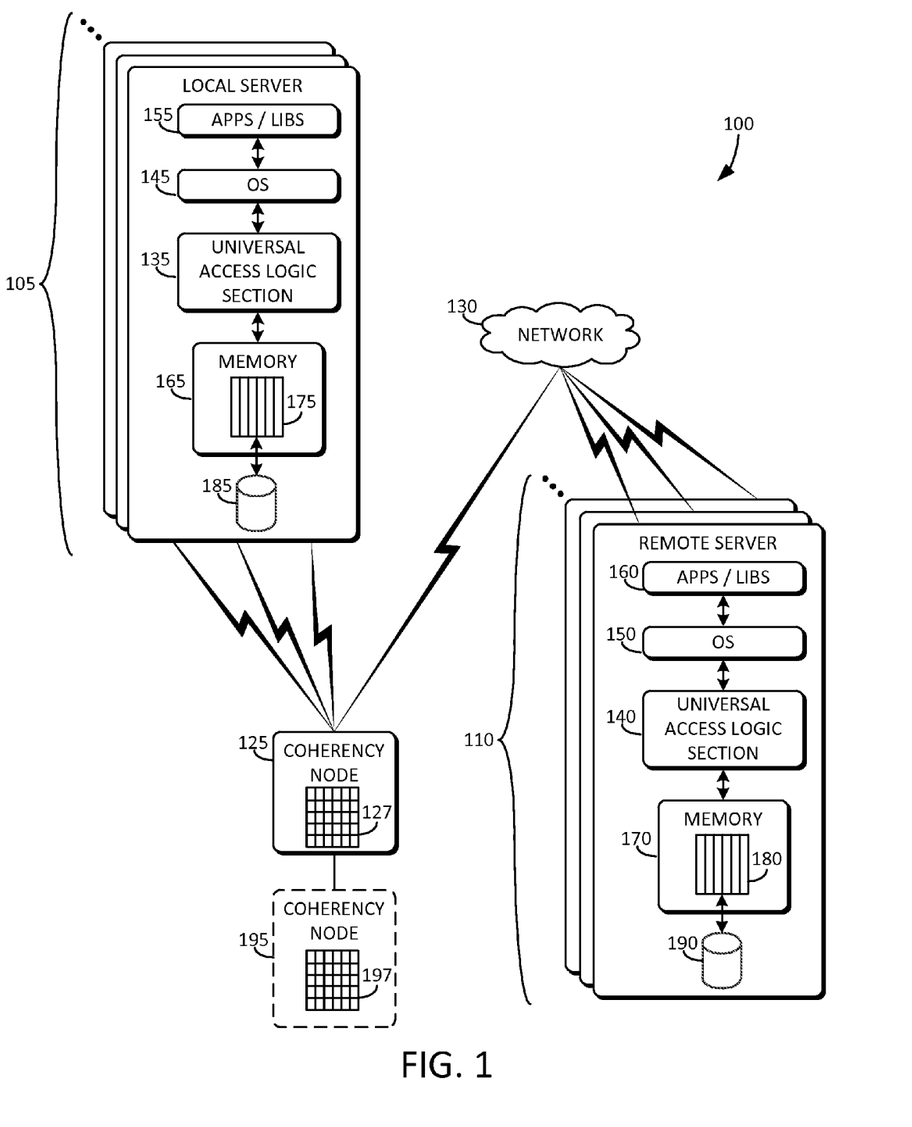
FIG. 1 is an example block diagram of a system including one or more local servers, one or more remote servers, and a coherency node connected to the local server and a network in accordance with embodiments of the inventive concept.

FIG. 1 is an example block diagram of a system 100 including one or more local servers 105, one or more remote servers 110, and/or a coherency node 125. The coherency node 125 can be directly connected to the one or more local servers 105. The coherency node 125 can be connected to the one or more remote servers 110 via a network 130. The one or more local servers 105 can each include a local universal access logic section 135. The one or more remote servers 110 can each include a remote universal access logic section 140.

The one or more local servers 105 can include one or more applications and/or libraries 155, an operating system 145, a universal access logic section 135, a memory 165 (e.g., system memory), and a storage device 185. The memory 165 can include queues 175 for accessing data stored on the storage device 185. The one or more remote servers 110 can include one or more applications and/or libraries 160, an operating system 150, a universal access logic section 140, a memory 170, and a storage device 190. The memory 170 can include queues 180 for accessing data stored on the storage device 190.

The coherency node 125 can be communicatively coupled to the one or more local servers 105 and to the one or more remote servers 110. The coherency node 125 can coordinate with the local universal access logic section 135 of the one or more local servers 105 and with the remote universal access logic section 140 of the one or more remote servers 110. The coherency node 125 can provide coherent access to data that is stored on the one or more local servers 105 to the one or more remote servers 110. In addition, the coherency node 125 can provide coherent access to data that is stored on the one or more remote servers 110 to the one or more local servers 105.

The coherency node 125 can include a consistency table 127 that can provide coherent access to the data stored on the one or more local servers 105 and to the data stored on the one or more remote servers 110. The consistency table 127 can provide coherent access to the data between the one or more local servers 105 and the one or more remote servers 110. In some embodiments, a second coherency node 195 can include a second consistency table 197 that can provide, in the event of a failure of the first coherency node 125, coherent access to the data stored on the one or more local servers 105 and to the data stored on the one or more remote servers 110. The consistency table 127 can provide coherent access to the data between the one or more local servers 105 and the one or more remote servers 110.

The coherency node 125 and/or the coherency node 195 can be a network switch, a computer server, a router, a bridge, or other suitable computing device capable of being connected to the network 130.

Figure 2:
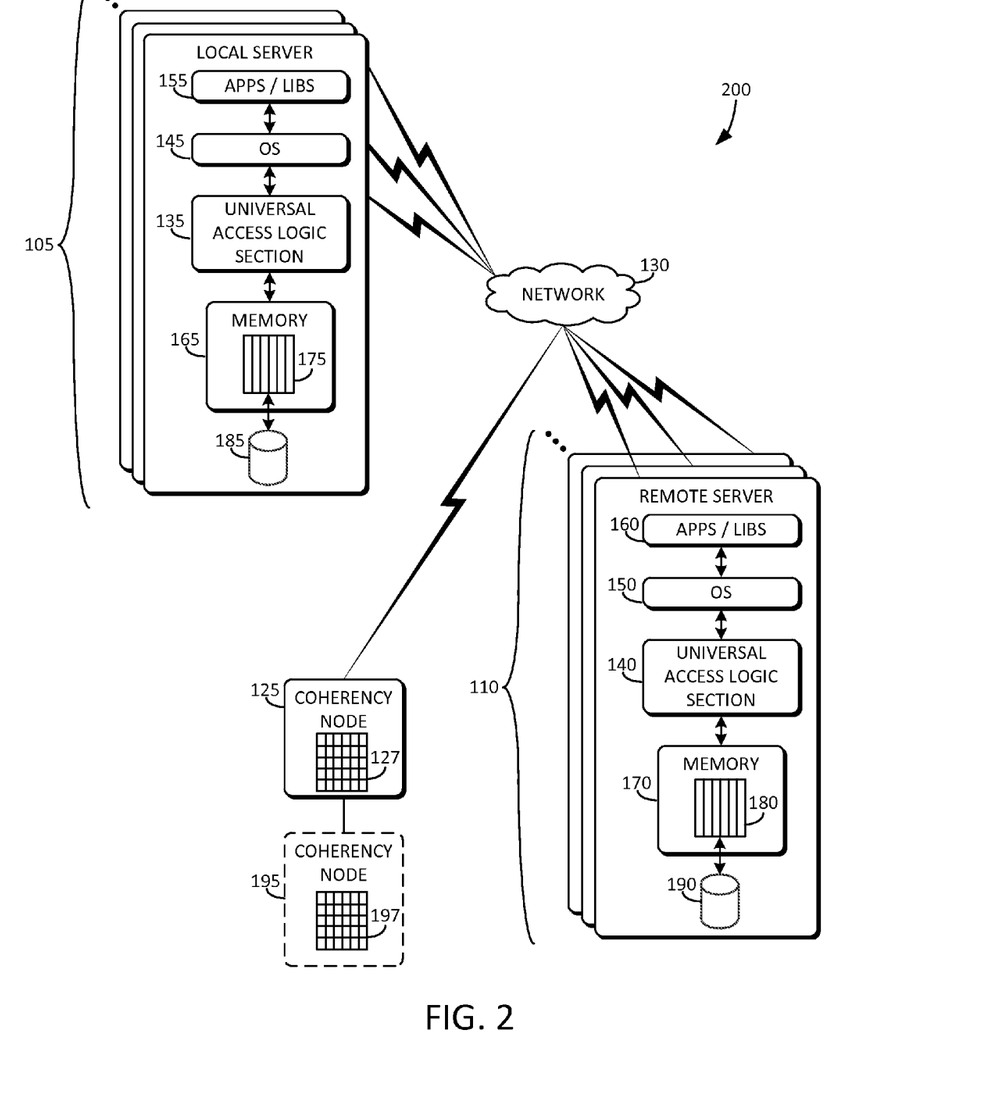
FIG. 2 is an example block diagram of a system including one or more local servers, one or more remote servers, and a coherency node connected to a network in accordance with embodiments of the inventive concept.

FIG. 2 is an example block diagram of a system 200 including one or more local servers 105, one or more remote servers 110, and a coherency node 125 connected to a network 130 in accordance with embodiments of the inventive concept. The system 200 is similar to the system 100 with the noted difference that the one or more local servers 105 are connected to the network 130 rather than directly connected to the coherency node 125. The other elements of the system 200 that are shared with the system 100 are described above and a detailed description of such elements is not repeated.

Figure 3:
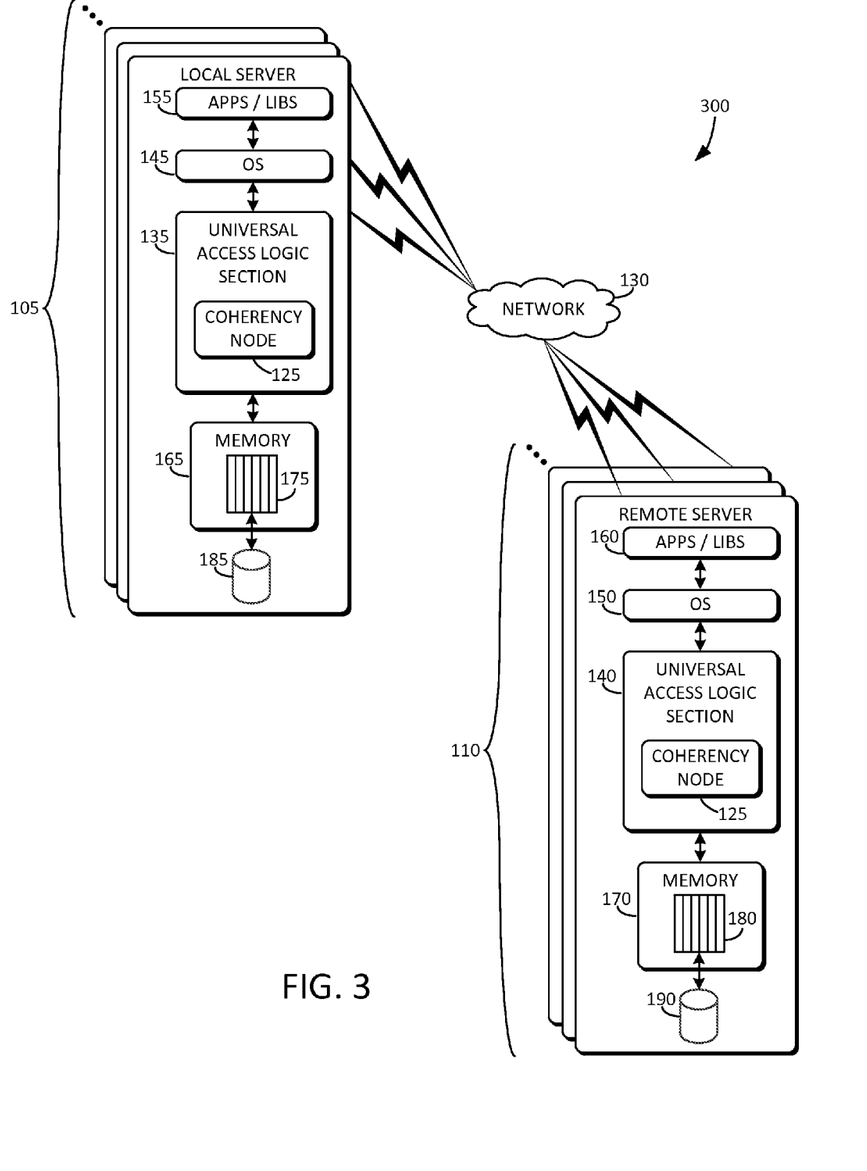
FIG. 3 is an example block diagram of a system including one or more local servers having a coherency node and one or more remote servers having a coherency node in accordance with embodiments of the inventive concept.

FIG. 3 is an example block diagram of a system 300 including one or more local servers 105 having a coherency node 125 and one or more remote servers 110 having a coherency node 125 in accordance with embodiments of the inventive concept. The system 300 is similar to the system 200 with the noted difference that the coherency node 125 is distributed among the one or more local servers 105 and the one or more remote servers 110. In this embodiment, a separate stand-alone coherency node need not be part of the system 300. Accordingly, coherency among universal access logic in servers may be distributed with no centralized coherency node. The other elements of the system 300 that are shared with the system 200 are described above and a detailed description of such elements is not repeated.

Figure 4:
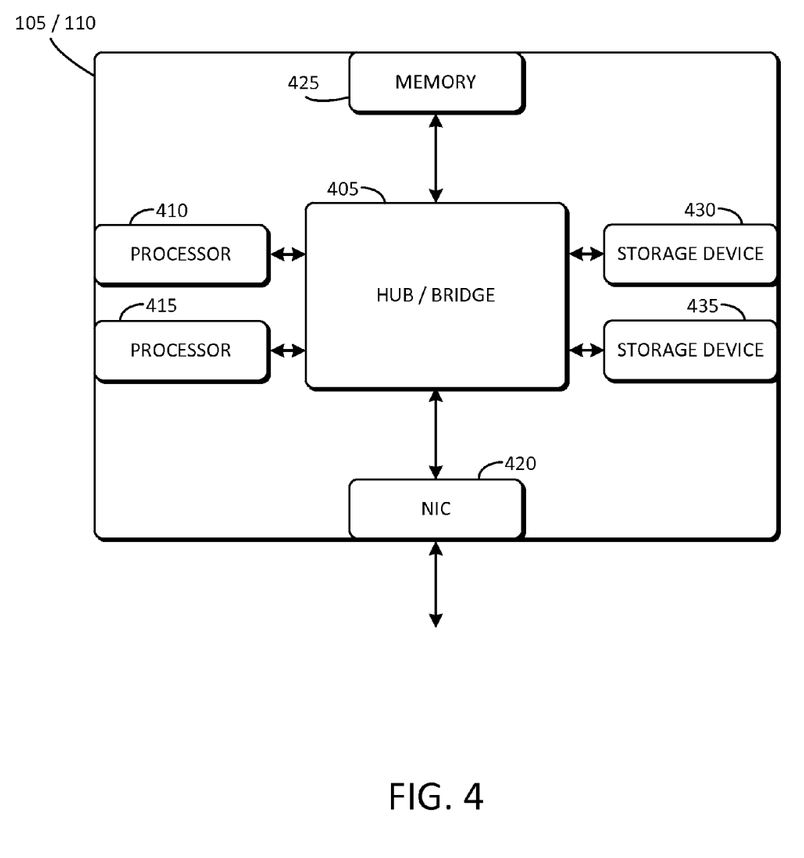
FIG. 4 is an example block diagram of a server including multiple processors, storage devices, a network interface card, memory, and a hub and/or bridge in accordance with embodiments of the inventive concept.

FIG. 4 is an example block diagram of a server 105/110 including multiple processors (e.g., 410 and 415), storage devices (e.g., 430 and 435), a network interface card 420, memory 425, and a hub and/or bridge 405 in accordance with embodiments of the inventive concept. Any of the one or more local servers 105 or one or more remote servers 110 can include the components illustrated and described herein.

Figure 5:
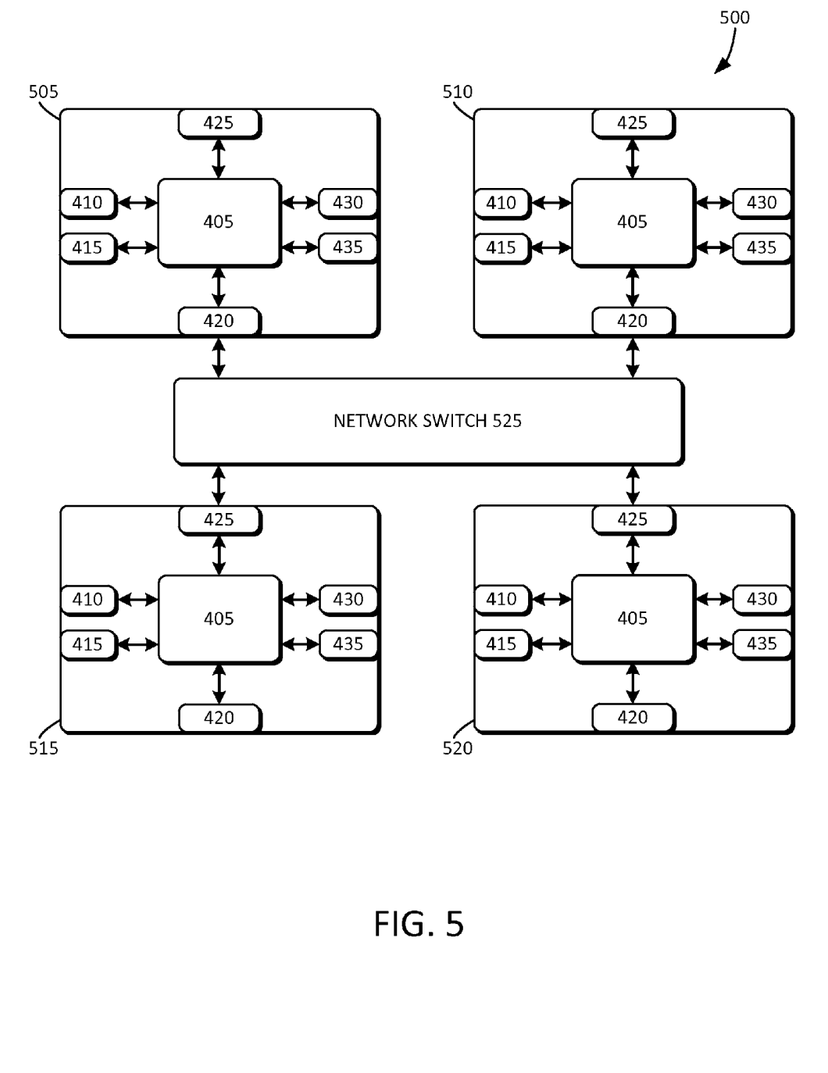
FIG. 5 is an example block diagram of multiple servers such as those of FIG. 4 in a network configuration in accordance with embodiments of the inventive concept.

FIG. 5 is an example block diagram of a system 500 including multiple servers such as those of FIGS. 1-4 in a network configuration using network switch 525 in accordance with embodiments of the inventive concept. Each of the servers 505, 510, 515, and 520 represent individual servers that are interconnected by means of the network switch 525. Each of the servers 505, 510, 515, and 520 can read data stored on any one of the other individual servers, as described herein. Moreover, each of the servers 505, 510, 515, and 520 can write data to storage devices of any one of the other individual servers, as described herein.

Figure 6:
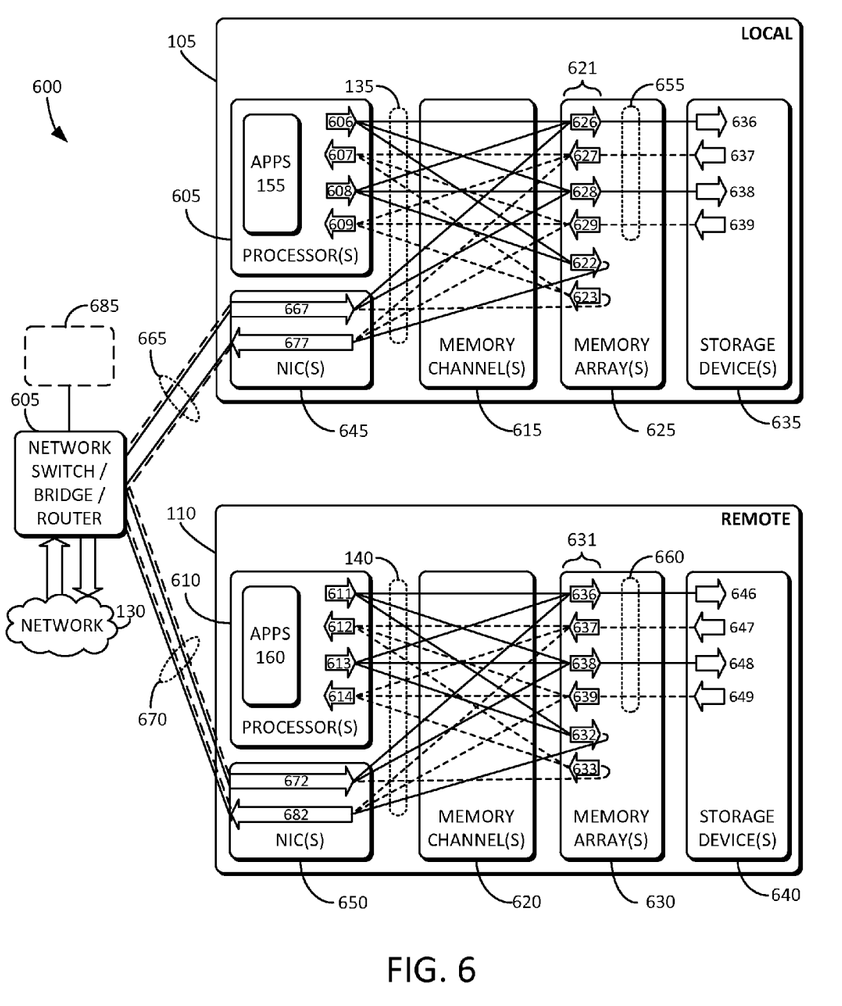
FIG. 6 is an example block diagram of a system including detailed aspects of one or more local servers and one or more remote servers in accordance with embodiments of the inventive concept.

FIG. 6 is an example block diagram of a system 600 including detailed aspects of one or more local servers 105 and one or more remote servers 110 in accordance with embodiments of the inventive concept. The system 600 can include a network device 605. The network device 605 can include a switch, bridge, and/or router, which can communicatively couple the one or more local servers 105 with the one or more remote servers 110. The network device 605 can communicate with the cloud 130. Any of the network connections 665 and 670 that connect the one or more local servers 105 and the one or more remote servers 110 to the network device 605 can be either direct connections, or alternatively, connections via the cloud 130. The network device 605 (e.g., switch, bridge, and/or router) can autonomously or through operation with another hardware entity 685 process and/or route incoming requests, and route them to an appropriate destination.

The terms "local" and "remote" are relative terms with respect to the distance between the local and remote servers, the distance to the network device 605, and/or the geographical separation of such servers or devices. For example, a group of local servers may share a rack space or be proximally located within a single building or closely situated buildings, whereas a remote server may be located in a different building that is miles away from the local servers, or perhaps in a remote town, city, or country.

The one or more local servers 105 (of FIGS. 1 and 6) can include one or more processors 605, an operating system (e.g., 145 of FIG. 1) to control the one or more processors 605, and/or one or more local applications 155 (of FIGS. 1 and 6) to execute on the operating system. Each of the one or more local servers 105 can include a network interface card (NIC) or unit 645.

The one or more local servers 105 can include multiple local write data queues (e.g., 606 and 608) associated with the one or more processors 605. It will be understood that while two local write data queues are shown, three or more local write data queues can be present and used. The local write data queues (e.g., 606 and 608) can queue local write data (e.g., 636 and 638) to be written to the local storage devices 635 for the one or more local applications 155 of the local server 105. The solid lines indicate pathways between queues for data that is being written to storage. Conversely, the broken lines indicate pathways between queues for data that is being read from storage.

The one or more local servers 105 can include one or more local incoming data queues (e.g., 667) associated with the NIC 645. The one or more local incoming data queues 667 can queue the local write data (e.g., 636 and 638) for writing to the local storage devices 635 by the one or more remote applications 160 of the remote server 110.

In some embodiments, each of the one or more local servers 105 can include multiple local read data queues (e.g., 607 and 609) associated with the one or more processors 605. It will be understood that while two local read data queues are shown, three or more local read data queues can be present and used. The local read data queues (e.g., 607 and 609) can queue local read data (e.g., 637 and 639) for the one or more local applications 155 of the local server 105.

In some embodiments, each of the one or more local servers 105 can include one or more local outgoing data queues (e.g., 677) associated with the NIC 645. The one or more local outgoing data queues 677 can queue local read data (e.g., 637 and 639) for the one or more remote applications 160 of the remote server 110.

The one or more local servers 105 can include multiple local memory channels 615 accessible by the one or more remote applications 160 and by the one or more local applications 155 via the local universal access logic section 135. Each of the one or more local servers 105 can include one or more local memory arrays 625. Each of the one or more local memory arrays 625 can include multiple storage queues 621. For example, each of the one or more local memory arrays 625 can include multiple local write storage queues (e.g., 626, 628, and 622) and multiple local read storage queues (e.g., 627, 629, and 623). It will be understood that while three of each kind of storage queue is shown, four or more of each kind of storage queue can be present and used.

A first subset (e.g., 626 and 628) of the local writes storage queues (e.g., 626, 628, and 622) can be associated with each of the local write data queues (e.g., 606 and 608) that are associated with the one or more processors 605. In other words, each queue within the first subset (e.g., 626 and 628) of the local writes storage queues can be communicatively cross-coupled to each of the local write data queues (e.g., 606 and 608).

A first subset (e.g., 627 and 629) of the local read storage queues (e.g., 627, 629, and 623) can be associated with each of the local read data queues (e.g., 607 and 609) that are associated with the one or more processors 605. In other words, each queue within the first subset (e.g., 627 and 629) of the local read storage queues (e.g., 627, 629, and 623) can be communicatively cross-coupled to each of the local read data queues (e.g., 607 and 609).

A second subset (e.g., 622) of the local write storage queues (e.g., 626, 628, and 622) can be associated with the one or more local outgoing data queues (e.g., 677) that are associated with the NIC 645. In other words, any queue in the second subset (e.g., 622) of the local write storage queues can be communicatively coupled to the local outgoing data queue 677.

A second subset (e.g., 623) of the local read storage queues (e.g., 627, 629, and 623) can be associated with the one or more local incoming data queues 667 that are associated with the NIC 645. In other words, any queue in the second subset (e.g., 623) of the local read storage queues can be communicatively coupled to the local incoming data queue 667.

The one or more local servers 105 can include one or more local storage devices 635 communicatively coupled to the first subset (e.g., 626 and 628) of the local write storage queues and to the first subset (e.g., 627 and 629) of the local read storage queues. The one or more local storage devices 635 can write the local write data (e.g., 636 and 638) received from the first subset (e.g., 626 and 628) of the local write storage queues, read the local read data (e.g., 637 and 639) stored on the one or more local storage devices, and/or provide the local read data (e.g., 637 and 639) to the first subset (e.g., 627 and 629) of the local read storage queues.

The one or more local outgoing data queues (e.g., 677) associated with the NIC 645 can receive remote write data (e.g., 646 and 648) from the second subset (e.g., 622) of the local write storage queues, and send the remote write data (e.g., 646 and 648) to the one or more remote servers 110 for writing to the remote storage devices 640. The one or more local incoming data queues (e.g., 667) associated with the NIC 645 can receive remote read data (e.g., 647 and 649) from the one or more remote servers 110, and send the remote read data (e.g., 647 and 649) to the second subset (e.g., 623) of the local read storage queues, so that the local applications 155 can access the remote read data.

The one or more memory arrays 625 can include a semaphore locking section 655 to lock individual data files on the one or more storage devices 635. Such locking can occur responsive to the coherency node (e.g., 125 of FIG. 1). For example, if a storage device is updated (written to), the uniform access interface (or act of write) can generate a message that is broadcast and acknowledged by all other processors within the same and remote servers. This message can indicate to all server processors that the information has changed and they need to be aware if interested in particular data. When the message is sent, a semaphore/lock can be set locally within the modified storage to indicate need for consistency. When an acknowledgement from other servers is received, the storage can clear the semaphore/release lock.

The one or more remote servers 110 can include one or more processors 610, an operating system (e.g., 150 of FIG. 1) to control the one or more processors 610, and/or one or more remote applications 160 to execute on the operating system. Each of the one or more remote servers 110 can include a network interface card (NIC) 650.

The one or more remote servers 110 can include multiple remote write data queues (e.g., 611 and 613) associated with the one or more processors 610. It will be understood that while two remote write data queues are shown, three or more remote write data queues can be present and used. The remote write data queues (e.g., 611 and 613) can queue remote write data (e.g., 646 and 648) to be written to the remote storage devices 640 for the one or more remote applications 160 of the remote server 110. The broken lines indicate pathways between queues for data that is being read from storage. Conversely, solid lines indicate pathways between queues for data that is being written to storage.

The one or more remote servers 110 can include one or more remote incoming data queues (e.g., 672) associated with the NIC 650. The one or more remote incoming data queues 672 can queue the remote write data (e.g., 646 and 648) for writing to the remote storage devices 640 by the one or more local applications 155 of the local server 105.

In some embodiments, each of the one or more remote servers 110 can include multiple remote read data queues (e.g., 612 and 614) associated with the one or more processors 610. It will be understood that while two remote read data queues are shown, three or more remote read data queues can be present and used. The remote read data queues (e.g., 612 and 614) can queue remote read data (e.g., 647 and 649) for the one or more remote applications 160 of the remote server 110.

In some embodiments, each of the one or more remote servers 110 can include one or more remote outgoing data queues (e.g., 682) associated with the NIC 650. The one or more remote outgoing data queues 682 can queue the remote read data (e.g., 647 and 649) for the one or more local applications 155 of the local server 105.

The one or more remote servers 110 can include multiple remote memory channels 620 accessible by the one or more remote applications 160 and by the one or more local applications 155 via the remote universal access logic section 140. Each of the one or more remote servers 110 can include one or more remote memory arrays 630. Each of the one or more remote memory arrays 630 can include multiple storage queues 631. For example, each of the one or more remote memory arrays 630 can include multiple remote write storage queues (e.g., 636, 638, and 632) and multiple remote read storage queues (e.g., 637, 639, and 633). It will be understood that while three of each kind of storage queue is shown, four or more of each kind of storage queue can be present and used.

A first subset (e.g., 636 and 638) of the remote writes storage queues (e.g., 636, 638, and 632) can be associated with each of the remote write data queues (e.g., 611 and 613) that are associated with the one or more processors 610. In other words, each queue within the first subset (e.g., 636 and 638) of the remote writes storage queues can be communicatively cross-coupled to each of the remote write data queues (e.g., 611 and 613).

A first subset (e.g., 637 and 639) of the remote read storage queues (e.g., 637, 639, and 633) can be associated with each of the remote read data queues (e.g., 612 and 614) that are associated with the one or more processors 610. In other words, each queue within the first subset (e.g., 637 and 639) of the remote read storage queues (e.g., 637, 639, and 633) can be communicatively cross-coupled to each of the remote read data queues (e.g., 612 and 614).

A second subset (e.g., 632) of the remote write storage queues (e.g., 636, 638, and 632) can be associated with the one or more remote outgoing data queues (e.g., 682) that are associated with the NIC 650. In other words, any queue in the second subset (e.g., 632) of the remote write storage queues can be communicatively coupled to the remote outgoing data queue 682.

A second subset (e.g., 633) of the remote read storage queues (e.g., 637, 639, and 633) can be associated with the one or more remote incoming data queues (e.g., 672) that are associated with the NIC 650. In other words, any queue in the second subset (e.g., 633) of the remote read storage queues can be communicatively coupled to the remote incoming data queue 672.

Each of the one or more remote servers 110 can include one or more remote storage devices 640 communicatively coupled to the first subset (e.g., 636 and 638) of the remote write storage queues and to the first subset (e.g., 637 and 639) of the remote read storage queues. The one or more remote storage devices 640 can write the remote write data (e.g., 646 and 648) received from the first subset (e.g., 636 and 638) of the remote write storage queues, read the remote read data (e.g., 647 and 649) stored on the one or more remote storage devices 640, and/or provide the remote read data (e.g., 647 and 649) to the first subset (e.g., 637 and 639) of the remote read storage queues.

The one or more remote outgoing data queues (e.g., 682) associated with the NIC 650 can receive the local write data (e.g., 636 and 638) from the second subset (e.g., 632) of the remote write storage queues, for writing to the local storage devices 635. The one or more remote incoming data queues (e.g., 672) associated with the NIC 650 can send the local read data (e.g., 647 and 649) to the second subset (e.g., 633) of the remote read storage queues, so that the remote applications 160 can access the local read data.

The one or more memory arrays 630 can include a semaphore locking section 660 to lock individual data files on the one or more storage devices 640. Such locking can occur responsive to the coherency node (e.g., 125 of FIG. 1). For example, if a storage device is updated (written to), the uniform access interface (or act of write) can generate a message that is broadcast and acknowledged by all other processors within the same and remote servers. This message can indicate to all server processors that the information has changed and they need to be aware if interested in particular data. When the message is sent, a semaphore/lock can be set locally within the modified storage to indicate need for consistency. When an acknowledgement from other servers is received, the storage can clear the semaphore/release lock.

In this manner, the local applications that run on the local servers can access any data on the local servers and the remote servers, and the remote applications that run on the remote servers can access any data on the remote servers and the local servers. Moreover, the universal access logic sections provide a uniform and consistent means for accessing, by the local or remote applications, any data from any server. Each server can have its own local storage but can also access the storage in other servers as well. The uniform access interface and logic sections allow all servers to use both local and remote storage. The uniform access interface and logic sections allow access of any storage regardless of local or remote in another server. In addition, the "local vs. remote" concept applies to messages between servers. For example, a server processor can communicate with another processor on the same server or remotely to a processor on another server. The uniform access interface application programming interface (API), command or semantics may be different if the information exchange is between processors on the same server, remote processor access across different servers, processor and storage on the same server, and/or remote storage access across different servers. Each server can use the uniform access interface and logic sections to access other entities (e.g., another processor on the same and/or remote server, local and/or remote storage). Since accesses are dynamic during application execution, the uniform access interface and logic sections can include the API. A GUI interface can be provided to set up the connection map of processor and storage access.

Figure 7:
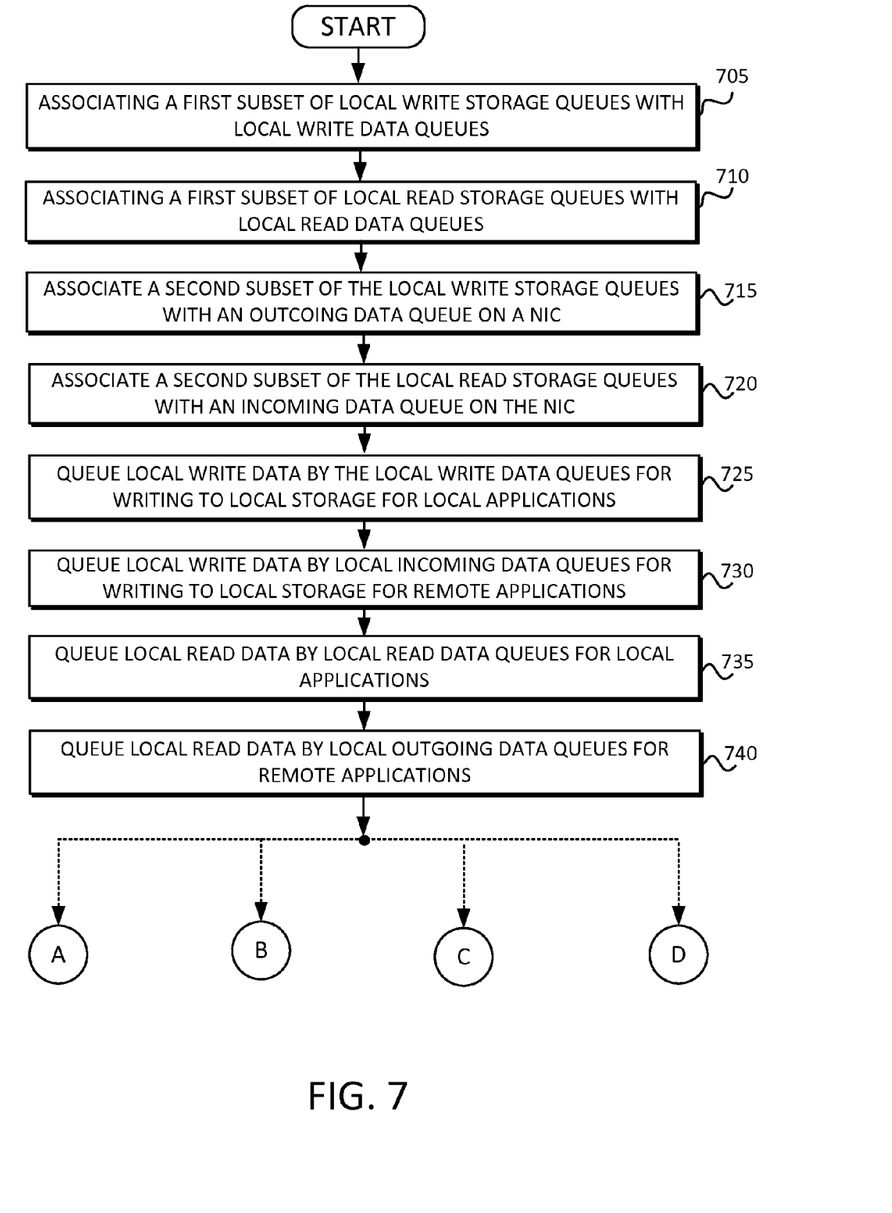
FIGS. 7 and 8 illustrate a flow diagram including a technique for providing universal parallel information access in accordance with embodiments of the inventive concept.
Figure 8:
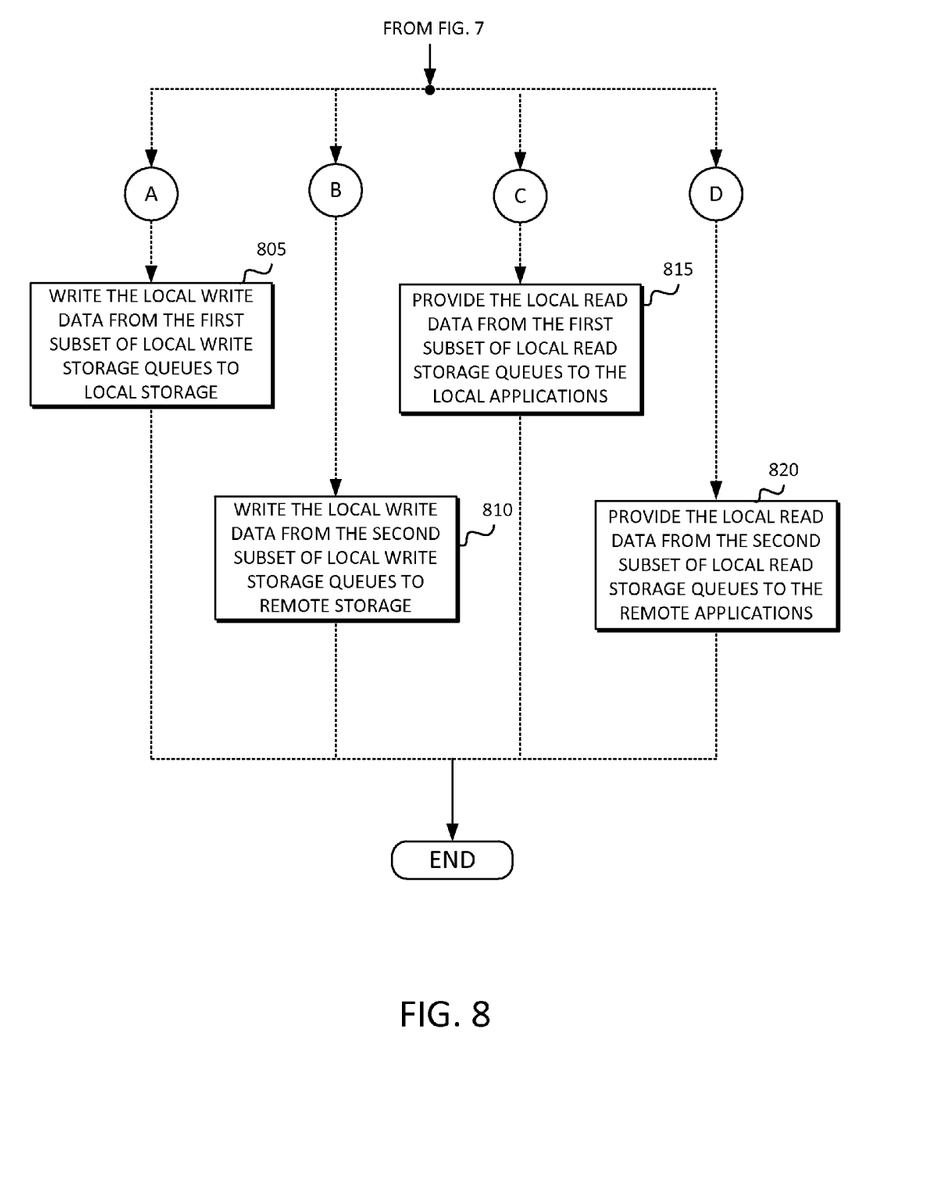

FIGS. 7 and 8 illustrate a flow diagram including a technique for providing universal parallel information access in accordance with embodiments of the inventive concept. The technique can include associating at 705, by a local server, a first subset of a plurality of local write storage queues with each of a plurality of local write data queues. The technique can include associating at 710, by the local server, a first subset of a plurality of local read storage queues with each of a plurality of local read data queues. The technique can include associating at 715, by the local server, a second subset of the plurality of local write storage queues with one or more local outgoing data queues that are associated with a network interface card (NIC). The technique can include associating at 720, by the local server, a second subset of the plurality of local read storage queues with one or more local incoming data queues that are associated with the NIC.

The technique can include queuing at 725, local write data, by the plurality of local write data queues, for writing to a local storage device of the local server for one or more local applications of the local server. The technique can include queuing at 730, the local write data, by the one or more local incoming data queues associated with the NIC for writing to the local storage device for one or more remote applications of a remote server. The technique can include queuing at 735, local read data, by the plurality of local read data queues associated with the local server, for the one or more local applications of the local server. The technique can include queuing at 740, the local read data, by the one or more local outgoing data queues associated with the NIC, for the one or more remote applications of the remote server.

The flow can proceed along one or more of paths A, B, C or D, as further illustrated in FIG. 8. The technique can include writing at 805, the local write data from the first subset of the plurality of local write storage queues to the local storage of the local server. The technique can include writing at 810, the local write data from the second subset of the plurality of local write storage queues to remote storage of the remote server. The technique can include providing at 815, the local read data from the first subset of the plurality of local read storage queues to the one or more local applications of the local server. The technique can include providing at 820, the local read data from the second subset of the plurality of local read storage queues to the one or more remote applications of the remote server.

It will be understood that the steps need not occur in the illustrated order, but rather, can occur in a different order and/or with intervening steps. It will also be understood that while the steps are written from the perspective of the local server, similar steps can be performed by the remote server. In such embodiments, the "local" elements can be replaced with "remote" elements and the "remote" elements can be replaced with "local" elements.

Figure 9:
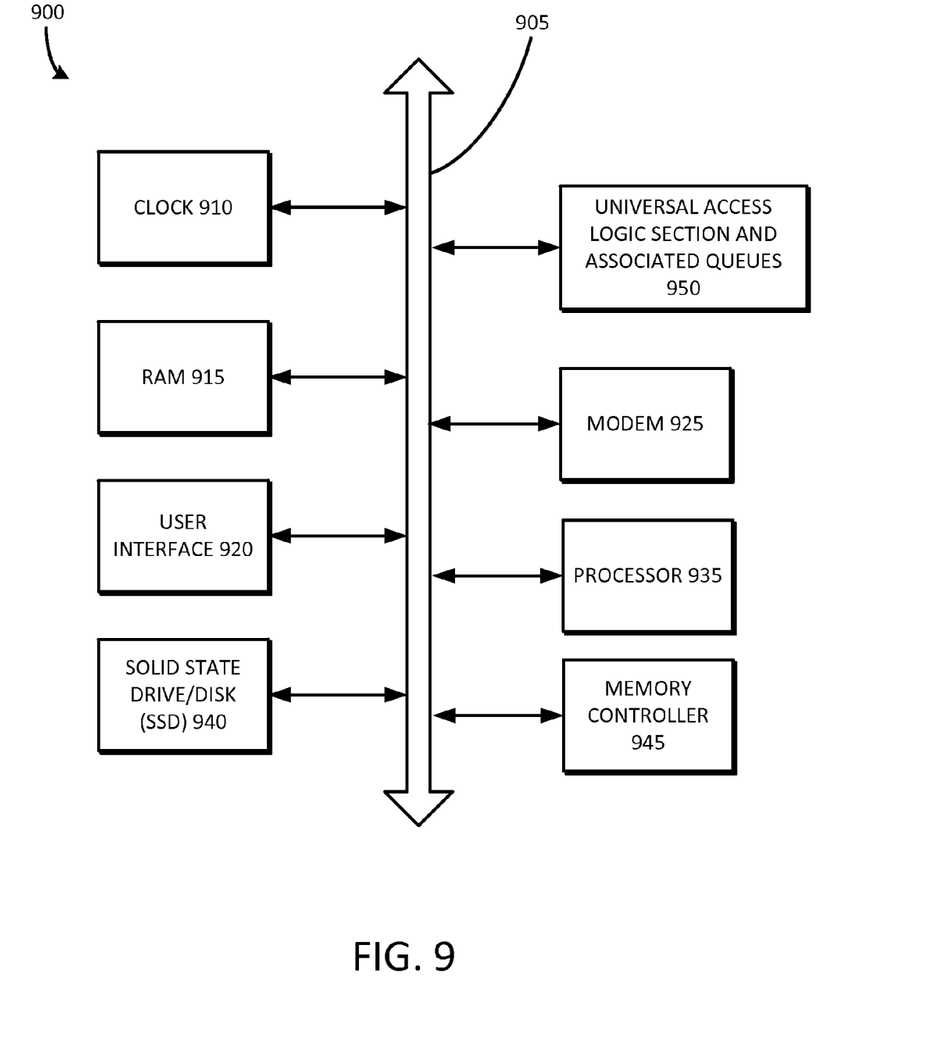
FIG. 9 is a block diagram of a computing system including the universal access logic section and associated queues as described in detail with reference to FIGS. 1-8 above.

FIG. 9 is a block diagram of a computing system 900 including the universal access logic section and associated queues 950 as described in detail with reference to FIGS. 1-8 above. Referring to FIG. 9, the computing system 900 may also include a clock 910, a random access memory (RAM) 915, a user interface 920, a modem 925 such as a baseband chipset, a solid state drive/disk (SSD) 940, a memory controller 945, and/or a processor 935, any or all of which may be electrically coupled to a system bus 905. The universal access logic section and associated queues 950 can correspond to those described in detail above, and as set forth herein, and may also be electrically coupled to the system bus 905.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A universal parallel information access system, comprising: one or more local servers each including a local universal access logic section, the one or more local servers being configured to communicate with one or more remote servers; and a coherency node communicatively coupled to the one or more local servers and configured to coordinate with the local universal access logic section of the one or more local servers, and to provide coherent access to first data that is stored on one or more local data-persistent storage devices of the one or more local servers to the one or more remote servers, wherein each of the one or more local servers includes: one or more local processors;
an operating system configured to control the one or more local processors; one or more local applications configured to execute on the operating system; a network interface card (NIC);
a plurality of local write data queues associated with the one or more local processors, wherein the plurality of local write data queues are configured to queue local write data for the one or more local applications;
one or more local incoming data queues associated with the NIC, wherein the one or more local incoming data queues are configured to queue the local write data for writing to the one or more local servers, by one or more remote applications;
a plurality of local read data queues associated with the one or more local processors, wherein the plurality of local read data queues are configured to queue local read data for the one or more local applications;
one or more local outgoing data queues associated with the NIC, wherein the one or more local outgoing data queues are configured to queue the local read data for the one or more remote applications; and
a plurality of local memory channels accessible by the one or more remote applications and by the one or more local applications via the local universal access logic section;
wherein the coherency node is referred to as a first coherency node, the system further comprising a second coherency node including a second consistency table configured to provide, in the event of a failure of the first coherency node, the coherent access to the first data and second data between the one or more local servers and the one or more remote servers, wherein:
the one or more remote servers each includes: a remote universal access logic section; one or more remote processors;
an operating system configured to control the one or more remote processors; the one or more remote applications configured to execute on the operating system of the one or more remote servers; a network interface card (NIC);
a plurality of remote write data queues associated with the one or more remote processors, wherein the plurality of remote write data queues are configured to queue remote write data for the one or more remote applications;
one or more remote memory arrays, each including a plurality of remote write storage queues and a plurality of remote read storage queues;
one or more remote incoming data queues associated with the NIC of the one or more remote servers, wherein the one or more remote incoming data queues are configured to queue the remote write data for writing to the one or more remote servers, by the one or more local applications;
a plurality of remote read data queues associated with the one or more remote processors, wherein the plurality of remote read data queues are configured to queue remote read data for the one or more remote applications;
one or more remote outgoing data queues associated with the NIC of the one or more remote servers, wherein the one or more remote outgoing data queues are configured to queue the remote read data for the one or more local applications;
a plurality of remote memory channels accessible by the one or more remote applications and by the one or more local applications via the remote universal access logic section; and
one or more remote data-persistent storage devices, wherein: a first subset of the plurality of remote write storage queues is associated with each of the plurality of remote write data queues that are associated with the one or more remote processors;
a first subset of the plurality of remote read storage queues is associated with each of the plurality of remote read data queues that are associated with the one or more remote processors;
a second subset of the plurality of remote write storage queues is associated with the one or more remote outgoing data queues that are associated with the NIC of the one or more remote servers;
a second subset of the plurality of remote read storage queues is associated with the one or more remote incoming data queues that are associated with the NIC of the one or more remote servers;
the one or more remote data-persistent storage devices are communicatively coupled to the first subset of the remote write storage queues and to the first subset of the remote read storage queues, and configured to write the remote write data received from the first subset of the remote write storage queues, read the remote read data stored on the one or more remote data-persistent storage devices, and provide the remote read data to the first subset of the remote read storage queues;
each of the one or more local servers includes one or more local memory arrays, each including a plurality of local write storage queues and a plurality of local read storage queues; the first coherency node is communicatively coupled to the one or more remote servers; the first coherency node is configured to coordinate with the remote universal access logic section of the one or more remote servers;
the first coherency node is configured to provide coherent access to the second data that is stored on the one or more remote data-persistent storage devices of the one or more remote servers to the one or more local servers;
the first coherency node includes a first consistency table configured to provide the coherent access to the first data and the second data between the one or more local servers and the one or more remote servers;
a first subset of the plurality of local write storage queues is associated with each of the plurality of local write data queues that are associated with the one or more local processors;
a first subset of the plurality of local read storage queues is associated with each of the plurality of local read data queues that are associated with the one or more local processors;
a second subset of the plurality of local write storage queues is associated with the one or more local outgoing data queues that are associated with the NIC of the one or more local servers;

a second subset of the plurality of local read storage queues is associated with the one or more local incoming data queues that are associated with the NIC of the one or more local servers;

the one or more local data-persistent storage devices are communicatively coupled to the first subset of the local write storage queues and to the first subset of the local read storage queues, and configured to write the local write data received from the first subset of the local write storage queues, read the local read data stored on the one or more local data-persistent storage devices, and provide the local read data to the first subset of the local read storage queues;

the one or more local outgoing data queues associated with the NIC of the one or more local servers are configured to receive the remote write data from the second subset of the plurality of local write storage queues, and to send the remote write data to the one or more remote servers;

the one or more local incoming data queues associated with the NIC of the one or more local servers are configured to receive the remote read data from the one or more remote servers, and to send the remote read data to the second subset of the plurality of local read storage queues;

the one or more local memory arrays include a semaphore locking section configured to lock individual data files on the one or more local data-persistent storage devices responsive to the first coherency node;

the one or more remote outgoing data queues associated with the NIC of the one or more remote servers are configured to receive the local write data from the second subset of the plurality of remote write storage queues, and to send the local write data to the one or more local servers; and the one or more remote incoming data queues associated with the NIC of the one or more remote servers are configured to receive the local read data from the one or more local servers, and to send the local read data to the second subset of the plurality of remote read storage queues.

* * * * *